United States Patent [19]
Pijanowski

[11] Patent Number: 5,011,362
[45] Date of Patent: Apr. 30, 1991

[54] VEHICLE WITH MULTI-POSITIONABLE FLAT BED

[76] Inventor: Joseph A. Pijanowski, 14351 Irving St., Brooksville, Fla. 34609

[21] Appl. No.: 414,519

[22] Filed: Sep. 29, 1989

[51] Int. Cl.$^5$ .............................................. B60P 1/04
[52] U.S. Cl. ...................................... 414/480; 16/362; 16/382; 16/DIG. 43; 298/9; 414/483; 414/494
[58] Field of Search ............... 414/346, 350, 477, 478, 414/479, 480, 482, 483, 491, 494; 403/53, 58, 78; 248/278, 279; 16/382, DIG. 43; 298/9

[56] References Cited

U.S. PATENT DOCUMENTS

| 399,806 | 3/1889 | Wayman | 298/9 |
|---|---|---|---|
| 1,910,398 | 5/1933 | Ludington | 414/350 X |
| 2,174,956 | 10/1939 | Allison | 298/9 |
| 2,278,449 | 4/1942 | Hutchinson | 298/9 |
| 2,786,590 | 3/1957 | Edwards et al. | 414/477 |
| 3,624,786 | 11/1917 | Lundahl | 414/483 X |
| 4,109,809 | 8/1978 | Clark | 414/491 X |
| 4,470,746 | 9/1984 | Delachapelle | 414/470 |
| 4,770,592 | 9/1988 | Winter | 414/494 X |

FOREIGN PATENT DOCUMENTS

| 3136700 | 3/1983 | Fed. Rep. of Germany | 414/494 |
|---|---|---|---|
| 3206805 | 9/1983 | Fed. Rep. of Germany | 414/494 |
| 1433425 | 5/1920 | United Kingdom | 298/9 |
| 172366 | 12/1921 | United Kingdom | 298/9 |
| 186679 | 9/1922 | United Kingdom | 298/9 |
| 402012 | 11/1933 | United Kingdom | 298/9 |

Primary Examiner—Robert J. Spar
Assistant Examiner—Robert S. Katz
Attorney, Agent, or Firm—Dominik, Stein et al.

[57] ABSTRACT

A roll-back flat-bed truck comprising a cab at the front end and a frame at the rear end and a flat bed secured thereto by securement member. The securement member includes a hinge having a lower hinge half-coupled to the frame and an upper hinge half coupled to the bed and a hinge pin coupling the hinge halves to allow tilting the upper hinge half and bed with respect to the lower hinge half and frame about a horizontal axis. A swivel plate is attached to the frame adjacent to the rear end of the bed. A swivel pin is positioned in an aperture extending through the swivel plate and lower hinge half to allow swiveling of the bed with respect to the frame about a vertical axis. An intermediate support is attached to the upper surface of the upper hinge half to slidably couple the bed thereto to allow for rolling the bed longitudinally with respect to the intermediate support, hinge and frame. Also provided are a first drive to slide the bed longitudinally with respect to the intermediate support, hinge and frame a second drive to tilt the bed, intermediate support and upper hinge half with respect to the lower hinge half, swivel plate and frame, and a third drive to swivel the bed, intermediate support and hinge with respect to the frame.

7 Claims, 10 Drawing Sheets

VEHICLE WITH MULTI-POSITIONABLE FLAT BED

BACKGROUND OF THE INVENTION

1. Field of the Invention

This invention relates to a vehicle with a multi-positionable flat bed and, more particularly, to a method and apparatus for loading cars or the like onto a bed as of a truck, trailer, train car or the like through mechanisms for effecting a compound pivoting/swivel motion of the bed.

2. Description of the Background Art

It is common to utilize a roll-back, flat-bed truck to quickly load and transport a car which has been disabled, in an accident, illegally parked, or which must be relocated from one sales area to another. In such situations, the transporting truck will be provided with a flat bed. Flat beds are normally movable with respect to the bed between a first or rest position on the truck frame and a second or loading position rolled-back and at an angle with respect to the frame so that the car to be transported may be moved thereon. Such beds are pivotable with respect to the truck between the two positions. In some instances the ramps are even capable of swiveling with respect to the truck in order to load cars oriented at awkward angles with respect to the location where the truck may position itself.

One of the more significant shortcomings of known devices is the inability to effect a swiveling motion of the bed when the bed is in the second or loading position, rolled back and tilted with respect to the truck. Such inability of prior art trucks renders them virtually incapable of conveniently loading a car parallel parked with its wheels locked in a turned position. If loading such a car is attempted, there is an undesired scraping of the tires on the ground during movement.

A wide variety of approaches have been attempted in the prior art to overcome such problems. By way of example, note U.S. Pat. No. 2,786,590 to Edwards wherein a flat bed may be variously repositioned with respect to a vehicle upon which it is positioned. Tilting is allowed in the truck loading embodiment, but without swiveling. In the rail car loading embodiment, swiveling is allowed only in association with an elevator-type arrangement.

Figure 5:
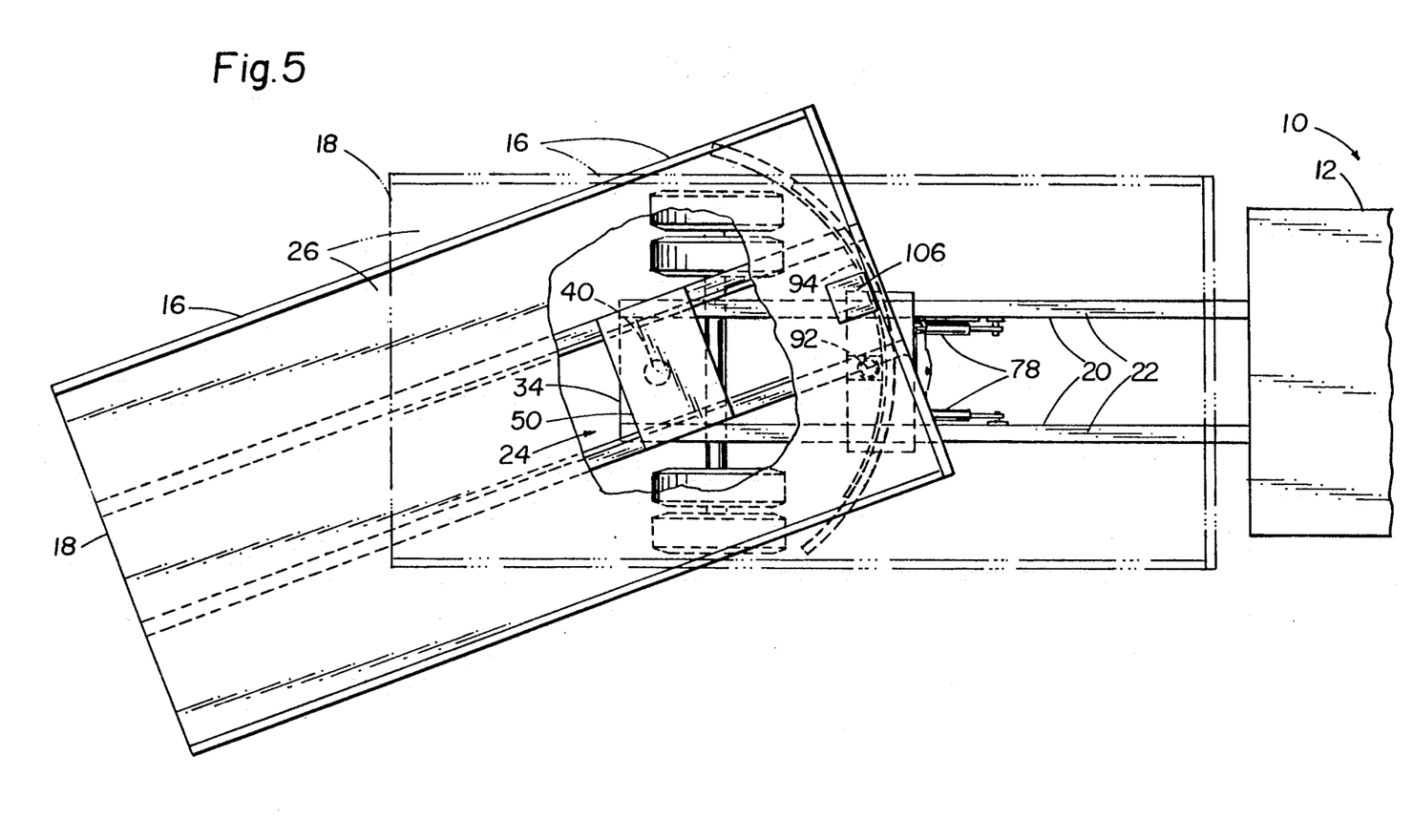
FIG. 5 is a plan view similar to FIGS. 1 and 3 but illustrating the bed in a tilted and swiveled position with the swivel mechanisms in the center, the pinion and rack to the left and the rear bed wheels to the right, all working together in sequence for aligning the bed with a car to be loaded.
Figure 6:
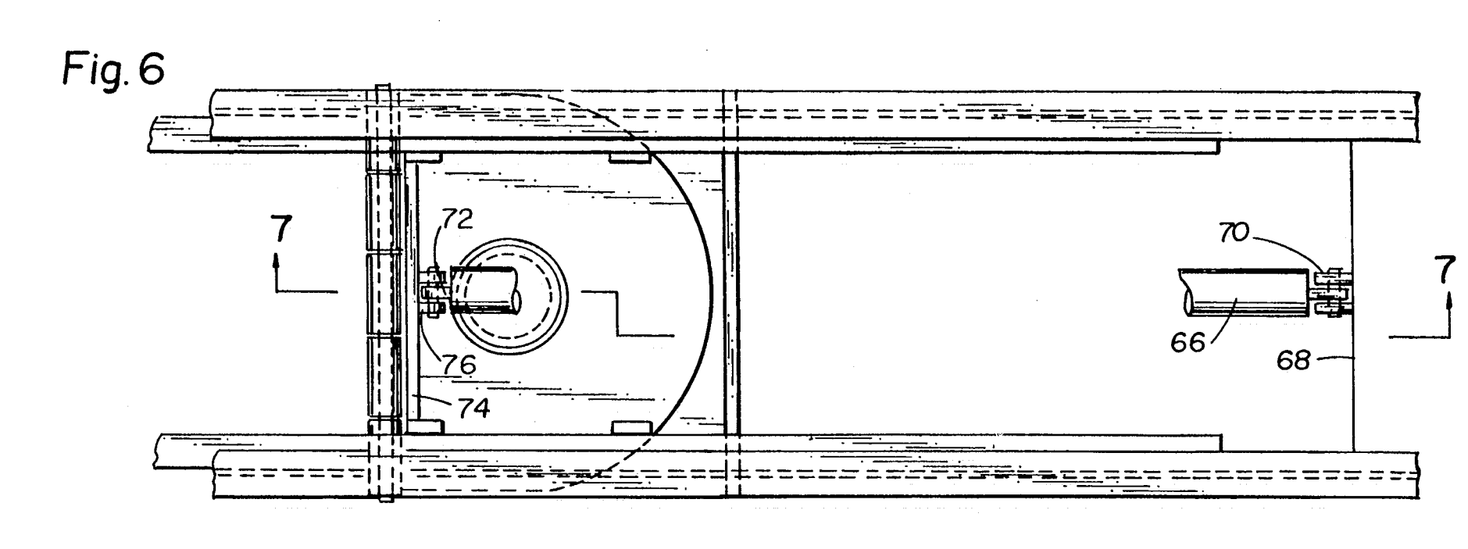
FIG. 6 is an enlarged plan view of the slide piston coupling with the bed to be extended.
Figure 7:
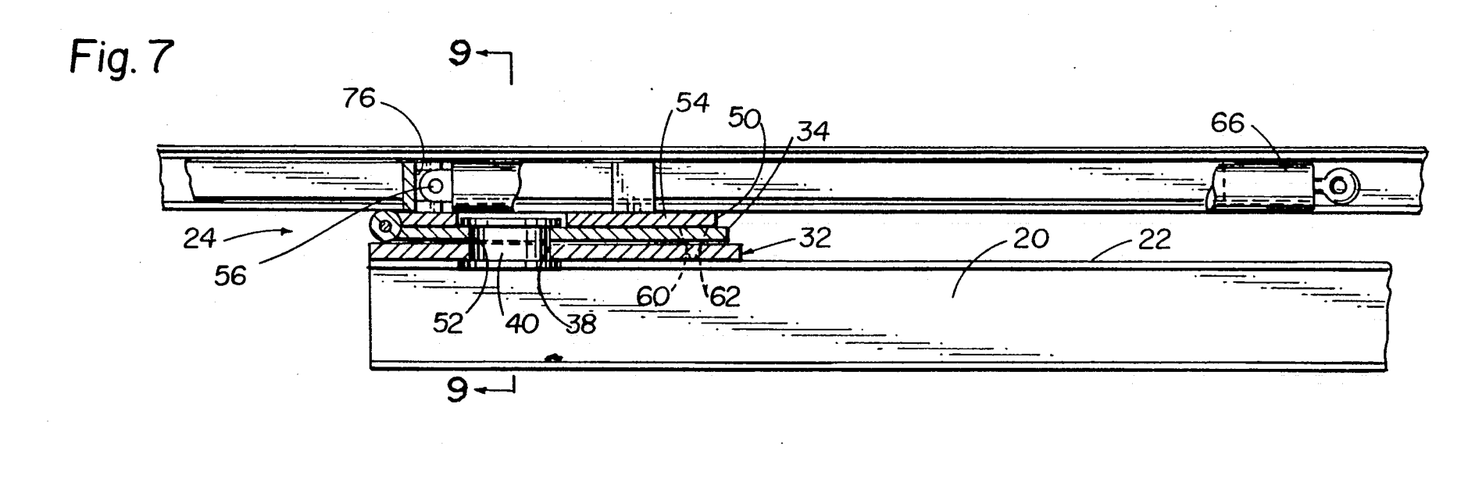
FIG. 7 is an enlarged side elevational view of the bed shown in FIG. 6.
Figure 8:
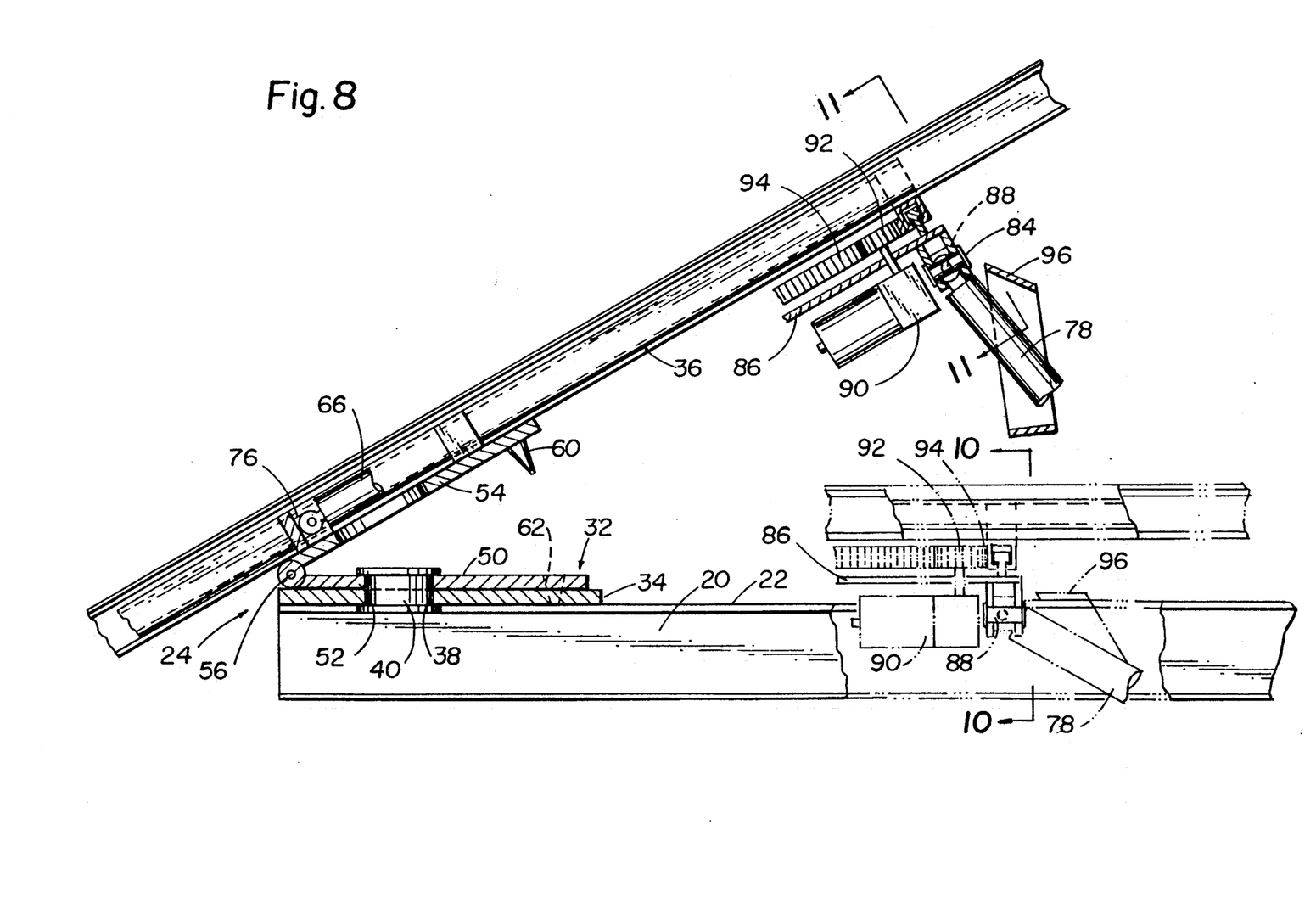
FIG. 8 is a sectional view of the mechanisms of FIG. 7 taken along line 8—8 of FIG. 7.
Figure 9:
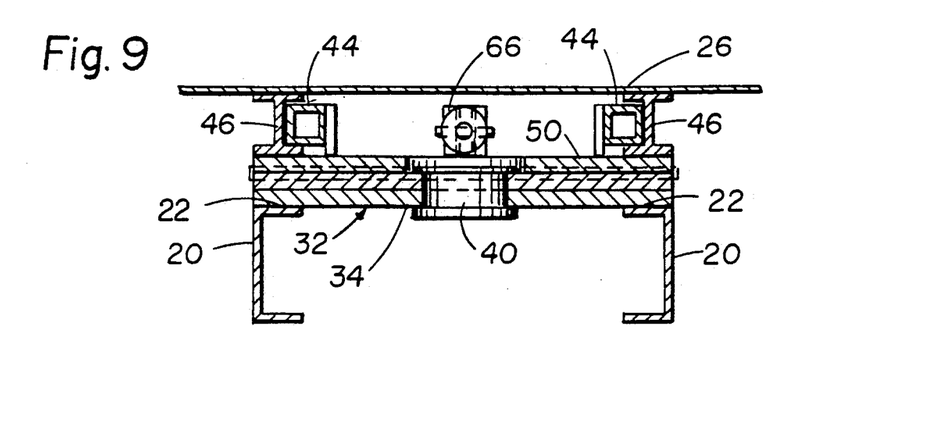
FIG. 9 is an enlarged side elevational view similar to FIG. 7 but illustrating the elevating pistons in their first or rest position as well as in the second or loading position.
Figure 10:
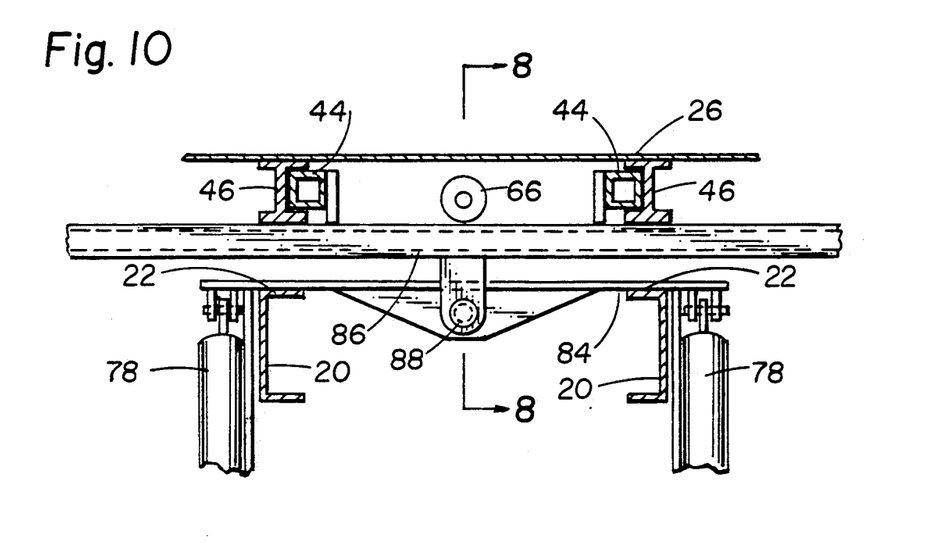
FIG. 10 is a sectional view of the mechanisms taken along line 10—10 of FIG. 9.
Figure 11:
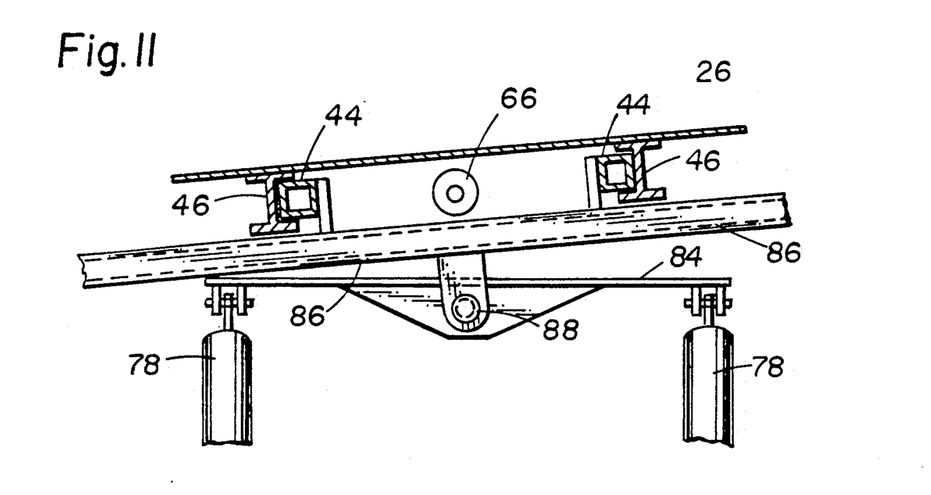
FIG. 11 is a sectional view of the mechanisms taken along line 11—11 of FIG. 9.

In another patent of interest, U.S. Pat. No. 4,470,746 to Delachapelle a bed is pivotable with respect to a truck frame. The bed is also swivelable. But, as shown in FIG. 5, the swivel effecting mechanisms 109 are located at the level of the tires at the center of the frame. As a result, swiveling can only occur when the bed is on the frame which minimizes the utility of the apparatus. Further, no mechanisms are provided to tilt the bed independent of its orientation.

In another body of prior art, there are various devices for effecting the pivoting motion of a bed with respect to a truck frame but without a disclosure of the swiveling in combination with the pivoting in a compound motion. Note U.S. Pat. No. 2,169,611 to Ratcliffe; 2,621,814 to Lisota; 2,703,658 to Bazell; 4,249,851 to Sedelmayer; 4,456,420 to Newhard; and 4,770,592 to Winter.

These various patent all disclose mechanisms which attempt to solve the problem addressed by the instant invention. All such prior art approaches, however, have failed to offer the benefits attendant with the present invention.

As illustrated by the large body of background art and commercial devices, efforts are continuously being made in an attempt to improve roll-back, flat-bed vehicles. No prior effort, however, suggests the present inventive combination of component elements arranged and configured as disclosed herein. Prior roll-back, flat-bed vehicles do not provide the benefits attendant with the present invention. The present invention achieves its purposes, objects and advantages over the prior art through a new, useful and unobvious combination of component elements, through the use of a minimum number of functioning parts, and through the use of only readily available materials and conventional components.

It is, therefore, an object of the present invention to provide an improved method and apparatus for coupling a flat bed to the frame of a vehicle comprising an upper hinge half coupled to the bed; a lower hinge half coupled to the frame; a hinge pin coupling the hinge halves to allow tilting of the upper hinge half and bed with respect to the lower hinge half and frame about a horizontal axis; slide means to couple the bed to the upper hinge half to allow for sliding of the bed longitudinally with respect to the hinge; and a swivel pin positioned between the bed and frame and extending through an aperture in one of the hinge halves to allow swiveling of the bed with respect to the frame.

It is a further object of the present invention to move a bed of a roll-back, flat-bed vehicle in a compound tilting/swiveling motion to extend their utility.

It is a further object of the present invention to configure a hinge with one end secured in a first location and with the other end tiltable and with a swivel element for effecting a compound tilting/swiveling motion between elements coupled by the hinge.

It is a further object of the present invention to load and transport cars more conveniently with a roll-back, flat-bed truck.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a further understanding of the invention may be had by referring to the summary of the invention and the detailed description of the preferred embodiment in addition to the scope of the invention defined by the claims taken in conjunction with the accompanying drawings.

SUMMARY OF THE INVENTION

The present invention is defined by the appended claims with the specific preferred embodiment shown in the attached drawings. For the purpose of summarizing the invention, the invention may be incorporated into an improved roll-back flat-bed truck comprising a cab at the front end and a frame at the rear end and a flat bed secured thereto by securement means, the securement means including a hinge having a lower hinge half coupled to the frame and an upper hinge half coupled to the bed and a hinge pin coupling the hinge halves to allow tilting the upper hinge half and bed with respect to the lower hinge half and frame about a horizontal axis; a swivel plate attached to the frame adjacent to the rear end of the bed and a swivel pin positioned in an aperture extending through the swivel plate and lower hinge half to allow swiveling of the bed with respect to the frame about a vertical axis; an intermediate support attached to the upper surface of the upper hinge half with means to slidably couple the bed thereto to allow for rolling the bed longitudinally with respect to the intermediate support, hinge and frame; first drive means to slide the bed longitudinally with respect to the intermediate support, hinge and frame; second drive means to tilt the bed, intermediate support and upper hinge half with respect to the lower hinge hald, swivel plate and frame; and third drive means to swivel the bed, intermediate support and hinge with respect to the frame. The first drive means is a piston coupling the intermediate support with the bed. The second drive means is a pair of pistons coupling the frame with the intermediate support and bed. The third drive means is a curved rack and a pinion coupling the intermediate support with the upper ends of the pistons. The truck further includes a yoke and a support bar pivotally coupled together by a thrust pin with the yoke coupled at its opposite ends to the upper ends of the pistons. The truck further includes a pinion motor secured to the support bar for driving the pinion with respect to the rack secured to the intermediate support. The truck further includes wheels coupled to the lower surface of the bed to contact the ground when the bed is in the rolled back and tilted position to facilitate the swiveling of the bed.

In addition, the invention may also be incorporated into improved mechanisms for coupling a flat bed to the frame of a vehicle comprising an upper hinge half coupled to the bed; a lower hinge half coupled to the frame; a hinge pin coupling the hinge halves to allow tilting of the upper hinge half and bed with respect to the lower hinge half and frame about a horizontal axis; slide means to couple the bed to the upper hinge half to allow for sliding of the bed longitudinally with respect to the hinge; and a swivel pin positioned between the bed and frame and extending through an aperture in one of the hinge halves to allow swiveling of the bed with respect to the frame.

The mechanisms further include a swivel plate attached to the frame with an aperture extending therethrough in alignment with the aperture of the hinge half for swiveling the hinge with respect to the swivel plate and frame about a vertical axis. The mechanisms further include an intermediate support attached to the upper surface of the upper hinge half and slidably receiving the bed for longitudinal movement with respect thereto.

In addition, the invention may also be incorporated into improved hinge for effecting a compound movement between a first member and a second member comprising a first hinge half; a second hinge half; a hinge pin coupling the first and second hinge halves for effecting a tilting movement therebetween; securement means coupling one hinge half to a first member; and swivel means rotatably coupling the other hinge half to a second member.

Lastly, the invention may be incorporated into an improved method of loading a car onto the bed of a vehicle comprising the steps of positioning the vehicle adjacent to the car to be loaded; rolling back and tilting the bed of the vehicle adjacent to the car; swiveling the bed to a position with a rear corner of the bed beneath a front corner of the car; tilting the bed to lift the front of the car; swiveling the bed to reposition the bed and car; tilting the bed to lower the front of the car; swiveling the bed to reposition the bed in alignment with the car; and pulling the car up the bed by a winch.

In one embodiment, the wheels of the car are aligned with the car. In another embodiment, the front wheels of the car are not aligned with the rear wheels of the car and further included are the step of pulling the front end of the car and the front wheels onto the bed when the bed is in a first position aligned with the front wheels and then repositioning the bed into alignment with the rear wheels followed by the step of pulling the remainder of the car onto the bed.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other methods and constructions for carrying out the same purposes of the present invention. It should also be realized by those skilled in the art that such equivalent methods and constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar reference characters refer to similar parts throughout the several figures.

DETAILED DESCRIPTION OF THE INVENTION

Figure 1:
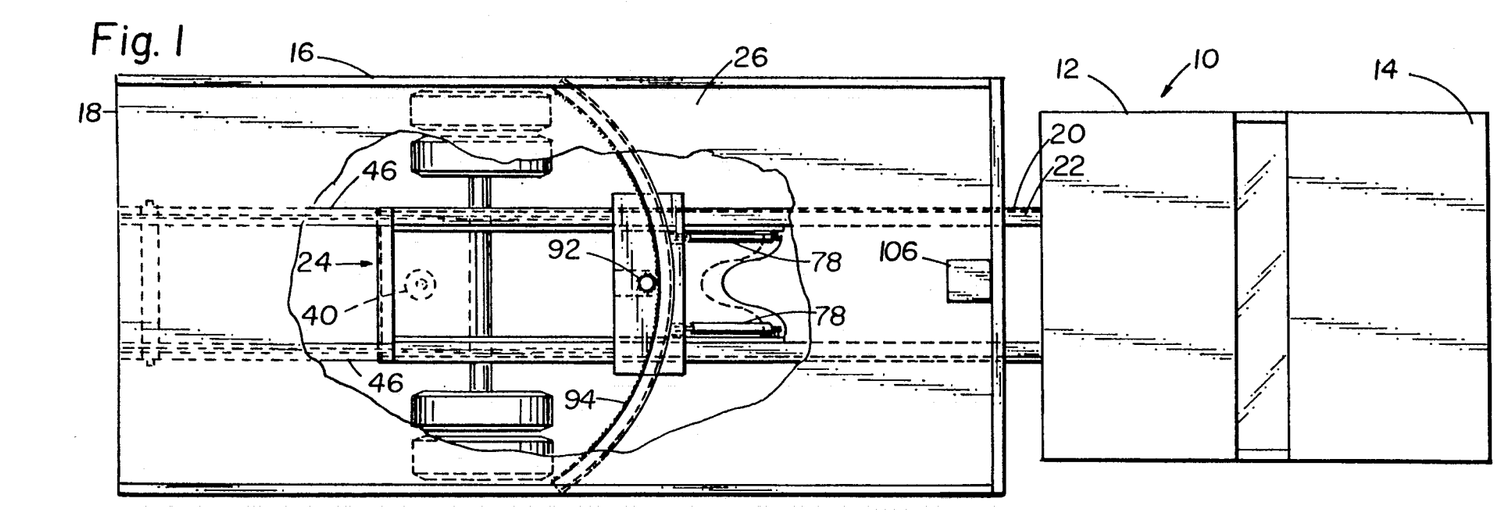
FIG. 1 is a plan view of a truck having a multi-positionable flat-bed constructed in accordance with the principles of the invention with parts broken away to show internal constructions thereof.

Shown in FIG. 1 is a roll back, flat-bed truck 10 which illustrates the preferred embodiment of the invention. It should be appreciated, however, that the present invention is applicable to various other types of large vehicles capable of transporting smaller vehicles. By way of example, the invention is applicable to flatbed trailers, rail cars and other large vehicles. In addition, smaller vehicles other than cars may be transported, as for example, small trucks, vans, motorcycles, etc.

Figure 2:
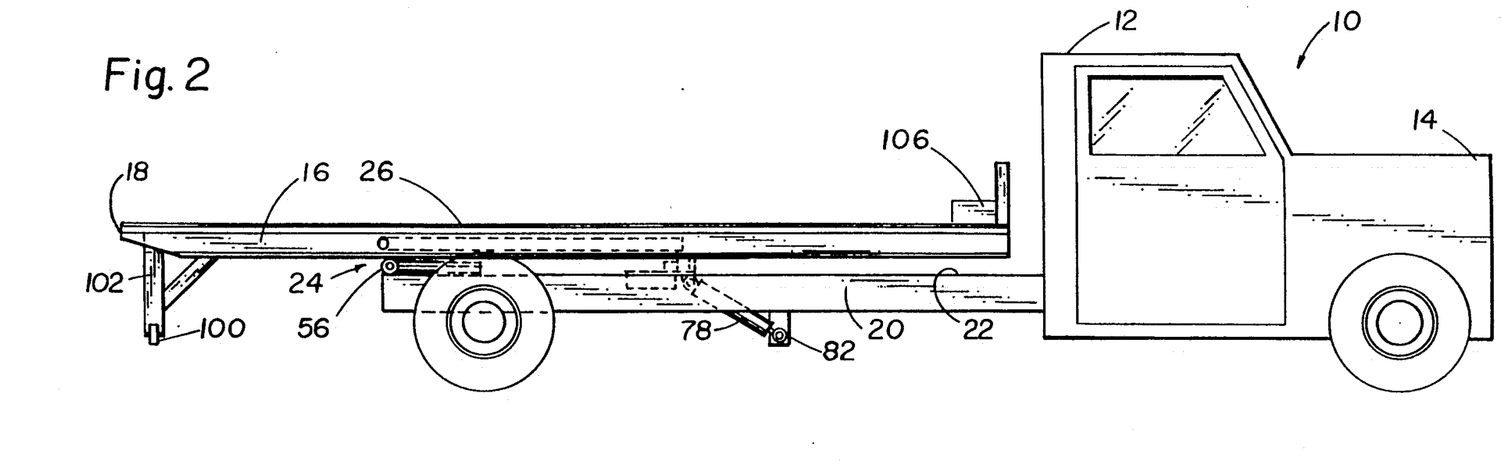
FIG. 2 is a side elevational view of the truck with the flat-bed as shown in FIG. 1.
Figure 3:
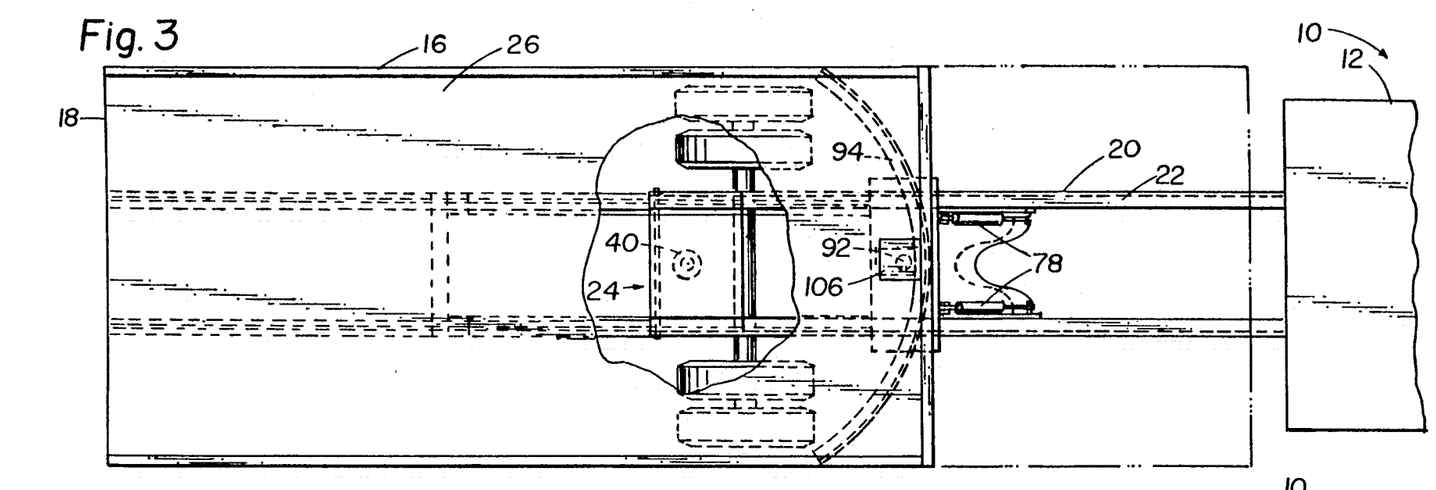
FIGS. 3 and 4 are plan and side elevational views similar to FIGS. 1 and 2 but illustrating the bed in the extended and tilted position.
Figure 4:
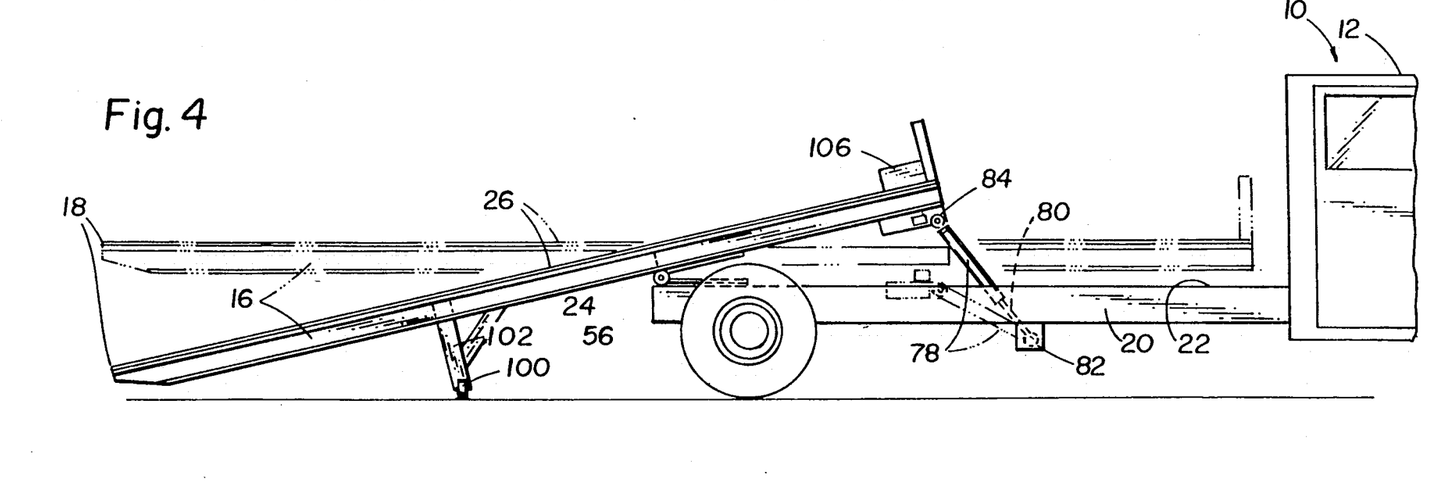

In the preferred embodiment of FIG. 1, the truck 10 is generally conventional and includes a cab 12 at the front end 14 and a frame 16 at the rear end 18. The frame is constructed of iron rails 20 with a generally flat upper surface 22. Such frame might be a flat, sheet metal member, but it is preferably made up of linear rails and cross members as shown. The upper surface 22 constitues a support for the unique motion imparting and guiding mechanisms 24 with the bed 26 located thereabove. The bed is essentially imperforate and has an upper surface for receiving the car 28 or other smaller vehicle to be transported. The bed may be positioned in a first or rest orientation, as shown in FIGS. 1 and 2, or in a second or loading orientation, as shown in FIGS. 3 and 4. In the rest orientation, the bed is positioned parallel with, overlying and supported by the lower bed.

Located between the bed 26 and the frame 20 are the mechanisms 24 for allowing a compound tilting and swiveling motion of the bed with respect to the frame of the truck. The mechanisms between the bed and frame include a hinge 32, a swivel plate 34 therebeneath, and an intermediate support 36 thereabove.

The swivel plate 34 is securely coupled to the upper surface of the bed 26 as by welding. It is preferably located at the rear end 18 of the frame 20 and truck, a location which extends utility to the mechanisms thereabove. A circular hole 38 extends through the swivel plate for receiving a swivel pin 40 coupling the hinge 32 to the swivel plate 34 and the frame 20 of the truck 10.

The intermediate support 36 is preferably formed of iron rails secured together in a generally rectangular configuration and including rectangularly-shaped metal guide bars 44 extending along the length thereof. The intermediate support is located immediately beneath the bed 26 and above the hinge 32 to which it is secured through vertical rails 46 and coupled thereto as by welding. The guide bars 44 function to support the bed and guide it in its longitudinal motion toward and away from the cab 12.

Located between the intermediate support 36 and the swivel plate 34 is the hinge 32. The hinge has a first or lower hinge plate 50 formed with a circular hole 52 for receiving the swivel pin 40. The upper hinge plate 54 is coupled to the intermediate support 36 as by welding. The hinge 32 overlies the swivel plate 34 and frame at its rearmost edge. Coupling is through the swivel pin 40. The second or upper hinge plate 54 is pivotally coupled to the lower hinge plate through a hinge pin 56 located parallel with the rear edge of the truck and frame. This location of the hinge pin 56 allows for tilting of the upper hinge plate 54 with respect to the lower hinge plate 50 and frame 20 about a first or horizontal axis of rotation for increased freedom of tilting movement.

The swivel pin 40 is circular in cross sectional shape to mate within the circular holes 38 and 52 within the lower hinge plate and the swivel plate 34. The upper and lower portions of the swivel pin 40 are enlarged like a rivet with the upper enlarged portion above the lower hinge plate 50 and the lower enlarged portion beneath the swivel plate 34. This allows the hinge 32 and components thereabove, including the bed, to swivel with respect to the swivel plate, frame and truck. The swiveling is about a vertical axis extending through the center of the swivel pin.

The bed is coupled to the hinge through the intermediate support 36. Coupling between the bed and intemediate support is effected through a pair of H-shaped iron rails depending from the lower surface of the bed in parallel relationship to each other as well as to the longitudinal centerline of the intermediate support, bed, frame and truck. The iron rails have their recessed surfaces facing each other for receiving the rectangularly shaped iron rails 44 which are secured to the upper surface of the intermediate support. The H-shaped iron rails 46 are adapted to be guided by the rectangularly shaped iron rails 44 for longitudinally moving the bed along its length.

Depending from the lower surface of the upper hinge half 54 is a conically shaped alignment pin 60. The pin is centrally located on the upper hinge half and is adapted to seat within a mating conical aperture 62 extending through the lower hinge half and swivel plate. In this manner, when the bed is in the rest position and the truck being driven with or without a car in the bed, the bed will be in a locked position against rotation for further safety of the system.

The compound motion is imparted to the bed by a series of motion imparting mechanisms interrelated to allow the bed to be extended or rolled back rearwardly along the intermediate member away from the cab, this allows the bed to be pivoted about the horizontal axis of the hinge pin 56 for tilting the bed with respect to the frame of the truck. This occurs through the raising of the foreward end of the intermediate support and bed. This also allows the bed and coupling mechanisms to rotate about the vertical axis of the swivel pin for swiveling the bed and coupling mechanisms with respect to the frame of the truck.

The first motion imparting mechanism is the slide piston 66. The slide piston has its cylinder pivotally coupled at its front end to a cross bar 68 of the intermediate support through a clevis 70. The reciprocal rod 72 of the slide piston 66 has its back end pivotally coupled to an intermediate cross bar 74 attached to the bed on its underside adjacent to the rear through a clevis 76. Movement of the rod 72 is under the control of the operator and is effected by introducing pneumatic or hydraulic fluid to one end of the cylinder or the other in the conventional manner as more fully described in the prior art as exemplified by the prior art as referred to hereinabove.

The second of the motion imparting mechanisms is the elevating pistons 78. The elevating pistons are a pair of conventional pistons located on opposite sides of the longitudinal centerline of the bed and frame. Each cylinder has its extension rod 80 pivotally coupled at its lower end to a lower portion of the frame through a clevis 82. The upper end of the cylinder of each elevating piston has its upper end pivotally coupled to a yoke 84. The yoke, in turn, is coupled to a support bar 86 through a thrust pin 88 to allow rocking of the support bar with respect to the yoke. The yoke and support bar are elevationally positioned by the elevating pistons 78. The yoke and support bar are not mounted for lateral movement or swiveling with the swiveling of the hinge or its related mechanisms. The support bar retains a motor 90 and pinion gear 92 for operatively coupling with a curved rack 94 on the underside of the intermediate support 36. Movement of the rods 80 of the elevating pistons is under the control of the operator and is effected by concurrently introducing pneumatic or hydraulic fluid to one end of the cylinders or the other in the conventional manner as more fully described in the prior art as referred to hereinabove.

Associated with the elevating pistons 78 are a pair of braces 96. Each brace is coupled at its upper end to the upper end of its associated piston. The braces extend downwardly to a lower end beneath the top of the frame. When the elevating pistons rise to lift the bed, the interior edges of the braces slide against adjacent portions of the frame to add strength and rigidity to the cylinders. This strength and rigidity is especially important when the bed is driven to swivel during operation and use.

The third of the motion imparting mechanisms is the rack 94 and pinion 92. The rack is secured beneath the lower surface of the intermediate support while the pinion is supported by the support bar 86 above the upper surface thereof. The rack is curved with its axis of rotation being the vertical axis of the swivel pin. The rack and pinion are located at the front end of the intermediate support 36. The pinion is driven in one direction of rotation or the other by the motor 90 depending from, and supported by, the support bar 86. Movement of the pinion and thus the rack is under the control of the operator and is effected by energizing the motor in the conventional manner.

The pivoting of the support bar 86 with respect to the yoke 84 is to accommodate the rocking movement of the front end of the intermediate support 36 and bed 26 when they are swiveled with the bed tilted. Swiveling when tilted tends to raise and lower the opposite ends of the intermediate member and bed thus effecting their rocking. To maintain the pinion 92 in proper meshing contact with the teeth of the rack 94 which has rocked from the horizontal, parallel with the truck frame, the pinion 92 is allowed to rock concurrently with the rack 94 under the influence of the rocking of the rack so that swiveling of the rack, intermediate member and bed may be properly effected.

The particularly disclosed rack and pinion mechanism is shown as the preferred embodiment for effecting the swiveling motion of the hinge, intermediate member and bed. It should be understood that a wide variety of other mechanisms could be utilized for such function. For example, a cable and worm gear, through a pulley assembly, could readily be utilized to move the bed and related mechanisms from one side to the other about the axis of the swivel pin. In addition, such mechanisms could also be located at other than the front end of the bed and intermediate members, as for example, at or adjacent to the hinge.

The particular choice of materials utilized throughout the frame, bed and components in between are well within the purview of one skilled in the arts. Steel would be the most commonly used material for the parts of the present invention. It has been found, however, that aluminum may be readily utilized and constitutes the preferred embodiment for the materials of the bed, intermediate support, hinge and swivel plate. By using aluminum rather than steel for these parts, it has been found that their function may be maintained and may be accomplished with cheaper and lighter weight materials, for improved efficiency, cost savings, and less fuel consumption during operation and use. Further, it has been found that the contacting surfaces which slide one against the other should be well greased during operation and use, particularly, the area between the lower hinge half and the swivel plate. In addition, the area of contact between the rails of the bed and intermediate support should also be well greased. It has been found, however, that wear generated by sliding is reduced and ease of sliding increased if sheets of a lubricious material such as ultra-high molecular weight polyethylene are employed on the upper surface of the swivel plate and the lower surface of the lower hinge half as well as the areas of contact between the rails of the bed and intermediate support. Such lubricious materials add great utility, life and convenience to the present invention.

Each of the motion imparting mechanisms, the slide piston 66, the elevating pistons 78 and the rack 94 and pinion may be activated and deactivated independently under the control of the operator. Consequently, any of the three motions, roll-back, elevating and swiveling may be imparted to the bed independent of the other two motions. In other words, the bed may be rolled forward to a rest position or rolled back to a loading position independent of the tilting or swiveling position. In addition, the bed may be tilted to an essentially horizontal position parallel overlying the bed frame when in the rest position or it may be tilted with its back end located downwardly as when in a loading position independent of the roll-back or swiveling position. Lastly, the bed may be swiveled from an aligned position wherein the longitudinal axis of the bed is aligned with the longitudinal axis of the frame and truck when in the rest position or it may be swiveled in either direction about the axis of the swivel pin when in the loading position independent of the roll-back or tilting position.

Swiveling of the bed when in the loading position is allowed and facilitated by freely rotatable wheels 100 supported by legs 102 attached to the lower surface of the bed. In this manner, the swiveling may be effected with the ramp in its rest or tilted position for loading.

Figure 12:
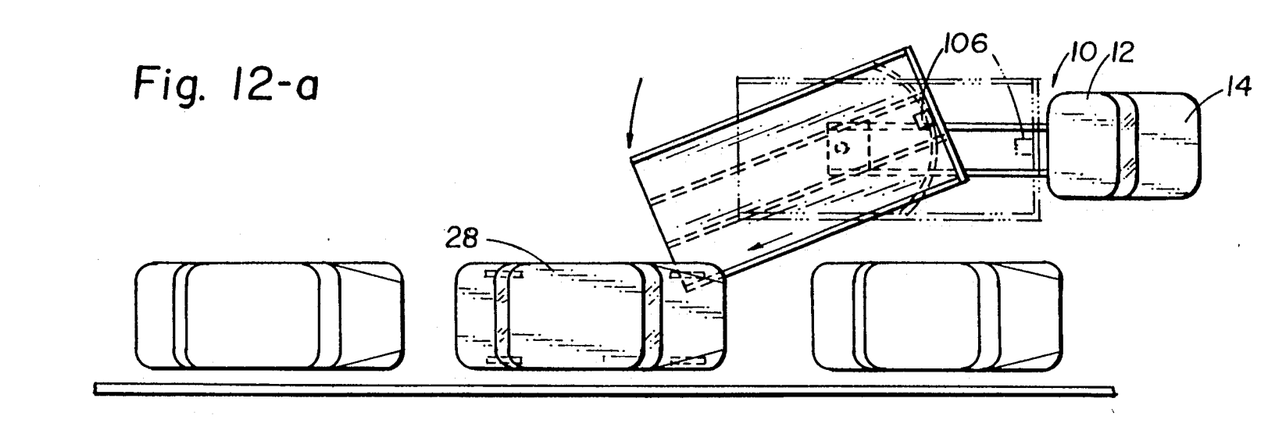
FIGS. 12a, 12b, 12c and 12d illustrate a technique for loading a car parallel parked at a curb.

FIGS. 12a, b, c and d illustrate the manner in which a parked car may be moved from a parallel position between two adjacent cars and loaded onto a roll-back, flat-bed of the truck constructed in accordance with the principles of the present invention. As illustrated in FIG. 12a, the bed is first rolled back by activating the slide piston. The bed is then tilted by activating the elevating pistons. Lastly, the bed is swiveled so that its rear right corner is under the front left corner of the car to be moved. The rear end of the bed is then raised to elevate the front of the car. This is effected by lowering the elevating pistons so that the bed pivots about the hinge pin axis. With the car raised, the bed is then pivoted clockwise through the rack and pinion and associated motor to move the front of the car in a counter clockwise manner facing out of its parking place. Note FIG. 12b. The bed is then lowered by raising the elevating piston. The bed is then swiveled counter clockwise so that it is in alignment with the car as shown in FIG. 12c. A conventional winch 106 attached to the front end of the bed is then utilized to pull the car to a central location on the flat bed. Note FIG. 12d. The bed is then swiveled into alignment with the truck, rolled forward and then tilted to bring the bed and loaded car into the rest position for being transported.

Figure 13:
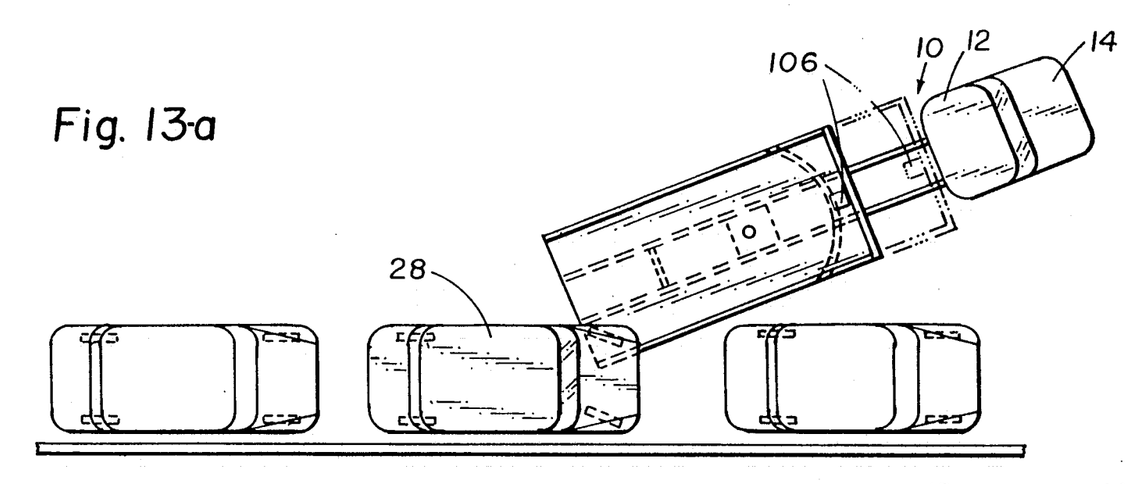
FIGS. 13a, 13b, 13c and 13d illustrate a car being loaded from a position parallel parked at a curb but with its front wheels locked in a turned position.

FIGS. 13a through d illustrate a car to be loaded similar to that in FIGS. 12a-d but with its wheels locked at an angle. The bed is first positioned in an angled loading position with the angle being aligned with the angle of the front tires. This position is shown in FIG. 13a. The winch is then utilized to pull the car partially up the bed to the FIG. 13b position. The rack and pinion and motor are then energized to align the bed with the truck and rear wheels of the car. The winch is once again energized to pull the car up the bed for being transported. Note the FIG. 13c and 13d showings. Note is taken that if the car is a front wheels drive, the linkage can be disconnected on the underside of the car to use the bed and winch in the manner as shown in FIGS. 12a-d.

The present disclosure includes that contained in the appended claims as well as that of the foregoing description. Although this invention has been described in its preferred form with a certain degree of particularly, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A roll-back flat-bed truck comprising a cab at the front end and a frame at the rear end and a flat bed secured thereto by securement means, the securement means including:

a hinge having a lower hinge half coupled to the frame adjacent to the rear end of the frame and an upper hinge half coupled to the bed and a hinge pin coupling the hinge halves to allow tilting the upper hinge half and bed with respect to the lower hinge half and frame about a horizontal axis;

a swivel plate attached to the frame adjacent to the rear end of the frame and a swivel pin positioned in an aperture extending through the swivel plate and lower hinge half to allow swiveling of the bed with respect to the frame about a vertical axis;

an intermediate support attached to the upper surface of the upper hinge half with means to slidably couple the bed thereto to allow for rolling the bed longitudinally with respect to the intermediate support, hinge and frame;

first drive means to slide the bed longitudinally with respect to the intermediate support, hinge and frame;

second drive means to tilt the bed, intermediate support and upper hinge half with respect to the lower hinge half, swivel plate and frame; and third drive means having a component adjacent to the front end of the intermediate support to swivel the bed, intermediate support and hinge with respect to the frame.

2. The truck as set forth in claim 1 wherein the first drive means is a piston coupling the intermediate support with the bed.

3. The truck as set forth in claim 1 wherein the second drive means is a pair of pistons coupling the frame with the intermediate support and bed.

4. The truck as set forth in claim 3 wherein the third drive means is a curved rack and a pinion coupling the intermediate support with the upper ends of the pistons.

5. The truck as set forth in claim 4 and further including a yoke and a support bar pivotally coupled together by a thrust pin with the yoke coupled at its opposite ends to the upper ends of the pistons.

6. The truck as set forth in claim 5 and further including a pinion motor secured to the support bar for driving the pinion with respect to the rack secured to the intermediate support.

7. The truck as set forth in claim 1 and further including wheels coupled to the lower surface of the bed to contact the ground when the bed is in the rolled back and tilted position to facilitate the swiveling of the bed.

* * * * *